US012269029B2

(12) United States Patent
El-Atab et al.

(10) Patent No.: US 12,269,029 B2
(45) Date of Patent: Apr. 8, 2025

(54) PRESSURE-DRIVEN FLUIDIC LOGIC GATE

(71) Applicant: KING ABDULLAH UNIVERSITY OF SCIENCE AND TECHNOLOGY, Thuwal (SA)

(72) Inventors: Nazek Mohamad El-Atab, Thuwal (SA); Javier Eduardo Chavarrio Canas, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 567 days.

(21) Appl. No.: 16/996,128

(22) Filed: Aug. 18, 2020

(65) Prior Publication Data

US 2021/0060552 A1 Mar. 4, 2021

Related U.S. Application Data

(60) Provisional application No. 62/892,655, filed on Aug. 28, 2019.

(51) Int. Cl.
*B01L 3/00* (2006.01)

(52) U.S. Cl.
CPC ... *B01L 3/502707* (2013.01); *B01L 3/502715* (2013.01); *B01L 3/50273* (2013.01); *B01L 2200/027* (2013.01); *B01L 2300/0816* (2013.01); *B01L 2300/0887* (2013.01)

(58) Field of Classification Search
CPC ............. B01L 3/5027; B01L 3/502723; B01L 2300/0867; B01L 2300/08; B01L 3/502707; B01L 3/502715; B01L 3/50273; B01L 2200/027; B01L 2300/0816; B01L 2300/0887; B01L 2300/0874; G01N 33/525
See application file for complete search history.

(56) References Cited

U.S. PATENT DOCUMENTS

2002/0106311 A1* 8/2002 Golbig .................. B01F 33/813 422/601
2006/0159601 A1* 7/2006 Yamada ............... B01J 19/0093 422/198

OTHER PUBLICATIONS

Ambient Definition & Meaning—Merriam-Webster, https://www.lb7.uscourts.gov/documents/17-cr-501.pdf (Year: 2018).*

* cited by examiner

*Primary Examiner* — Dean Kwak
(74) *Attorney, Agent, or Firm* — PATENT PORTFOLIO BUILDERS PLLC

(57) ABSTRACT

A microfluidic chip includes a substrate; plural layers formed on top of each other over the substrate; a top layer formed over the plural layers; a first input port formed into the top layer; a second input port formed into the top layer; a first output port formed into a first layer of the plural layers; and a second output port formed into a second layer of the plural layers. The second layer is formed over the first layer.

11 Claims, 15 Drawing Sheets

PRESSURE-DRIVEN FLUIDIC LOGIC GATE

CROSS-REFERENCE TO RELATED APPLICATIONS

This application claims priority to U.S. Provisional Patent Application No. 62/892,655, filed on Aug. 28, 2019, entitled "PRESSURE-DRIVEN FLUIDIC LOGIC GATE," the disclosure of which is incorporated herein by reference in its entirety.

BACKGROUND

Technical Field

Embodiments of the subject matter disclosed herein generally relate to a logic gate for Boolean operations, and more particularly, to a microfluidic, pressure-driven, chip that implements a logic gate that can perform Boolean operations based on a fluid input to the chip.

Discussion of the Background

Recent developments in microfluidics are tackling technological challenges in a wide range of applications including chemistry, 3D printing, tissue engineering, drugs development, biomedical research, and most lately organs-on-chip. Particularly, microfluidic devices which enable the handling of exceptionally low volumes of fluids in the range of micro- to pico-liters are employed in biological and chemical analysis applications due to the precise manipulation of particles and liquids in a microscopic environment.

Additionally, the microfluidic devices can provide the opportunity to analyze, isolate, concentrate, control, and identify biomolecules with an improved sensitivity and throughput, in addition to being simpler and easier than conventional techniques. For instance, microfluidics have recently shown the capability to use very small amounts of samples and chemicals to detect cancer cells and their interaction with myeloid cells with high sensitivity, high resolution, fast analysis and low cost.

The future generation of microfluidic devices should be capable of performing in-situ complex sample analysis and treatment. For example, it is desired to fabricate active functions, such as pumps and mixers in integrated microfluidic chips. Today, the existing integrated circuits can execute complex operations using electronic building blocks known as logic gates, which are typically implemented by one or more electrical devices, e.g., diode, transistor, etc. This allows the system to autonomously make decisions following Boolean rules, thus eliminating the necessity for any manual intervention. Therefore, in order to automatically categorize, tag, isolate, and identify markers in complex fluidic samples such as blood, drugs, sweat and so on, it is necessary to include microfluidic logic functions that can fluidly interact with the fluidic samples, without another device that "translates" the physical characteristics of the fluid into an electrical signal, for achieving miniaturized analysis.

To date, multiple techniques have been demonstrated for logic computing including fluid flow resistance, electrochemical reactions, fluorescent molecular devices, nonlinearity in fluid viscosity, and bubbles flowing in microchannels. Nonetheless, the major drawbacks of these approaches lie in the different interpretations of the input/output signals in addition to the requirement for specially functionalized liquids for the logic gates to properly operate, which makes the scaling and integration of multiple logic gates in a single platform more complicated and challenging.

As a result, microdroplet-based microfluidic computation has received a growing attention in the past years due to its simple interpretation of output signals, where the presence and absence of the droplet represents the binary signals 1 and 0, respectively. However, this approach still requires the generation of microdroplets and their dispersal in another continuous liquid, in addition to the different required mechanisms for microdroplet movement such as relative flow resistance, applied voltage, magnetic field, etc.

Thus, there is a need for a new system that is capable of operating using any fluid and the system can be easily manufactured and scaled up as necessary.

BRIEF SUMMARY OF THE INVENTION

According to an embodiment, there is a microfluidic chip that includes a substrate, plural layers formed on top of each other over the substrate, a top layer formed over the plural layers, a first input port formed into the top layer, a second input port formed into the top layer, a first output port formed into a first layer of the plural layers, and a second output port formed into a second layer of the plural layers. The second layer is formed over the first layer.

According to another embodiment, there is a microfluidic chip that is configured to return a logic function OR and a logic function AND. The chip includes a first input port formed into a top layer, a second input port formed into the top layer, a first output port formed into a first layer, a second output port formed into a second layer, wherein the second layer is formed over the first layer, and a network of fluidic microchannels fluidly connecting the first input port, the second input port, the first output port, and the second output port. The first and second output ports are located to create different pressure drops with the first and second inlet ports so that (1) a fluid entering only the first input port or only the second input port, exits only the first output port, and (2) the fluid entering both the first and second input ports, exits both the first and second output ports.

According to yet another embodiment, there is a method of using a microfluidic chip to achieve a logic function OR and a logic function AND. The method includes injecting a fluid only into a first input port or only a second input port of the chip, outputting only at a first output port the fluid and not at a second output port, to achieve the logic function OR, as the second output port is located between (1) the first and second input ports and (2) the first output port, along a line that is perpendicular to a top layer of the chip, injecting the fluid into both the first input port and the second input port, and outputting at both the first output port and the second output port the fluid to achieve the logic function AND.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to a pressure-driven 3D microfluidic logic gate having four layers. However, the embodiments to be discussed next are not limited to four layers in such a gate, but may be applied to gates having more or less layers, and also to plural logic gates that are connected to each other to form a more complex analyzing system.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, there is a pressure-driven 3D microfluidic logic gate formed as a chip that can operate using any fluid. The operation of the chip is based on the fluid pressure within microchannels formed in the microchip, which is dictated by the flow rate of the fluid and the location of the input ports and output ports. The flow rate of the fluid is controlled by using a syringe pump, a conventional tool that is used in most of the microfluidics applications. It is worth to note that the flow pressure within the microchannels also depends on the hydraulic resistance of the fluid, which is a function of the microchannel dimensions, surface roughness of the microchannels, and the fluid viscosity. However, in one application, these variables are fixed and known for a specific chip and a specific fluid. The 3D microfluidic chip may be fabricated, as discussed later, using $CO_2$ ablation of Poly(methyl methacrylate) (PMMA) sheets and these sheets are then bonded together using a thermo-compression process. Two Boolean logic gates AND and OR are implemented in the microfluidic chip. In this chip, the presence of the fluid at the output is interpreted as a binary signal 1 while the absence of the fluid is a binary signal 0. The present approach allows easy integration and cascading of microfluidic logic gates for complex logic computations.

Figure 1:
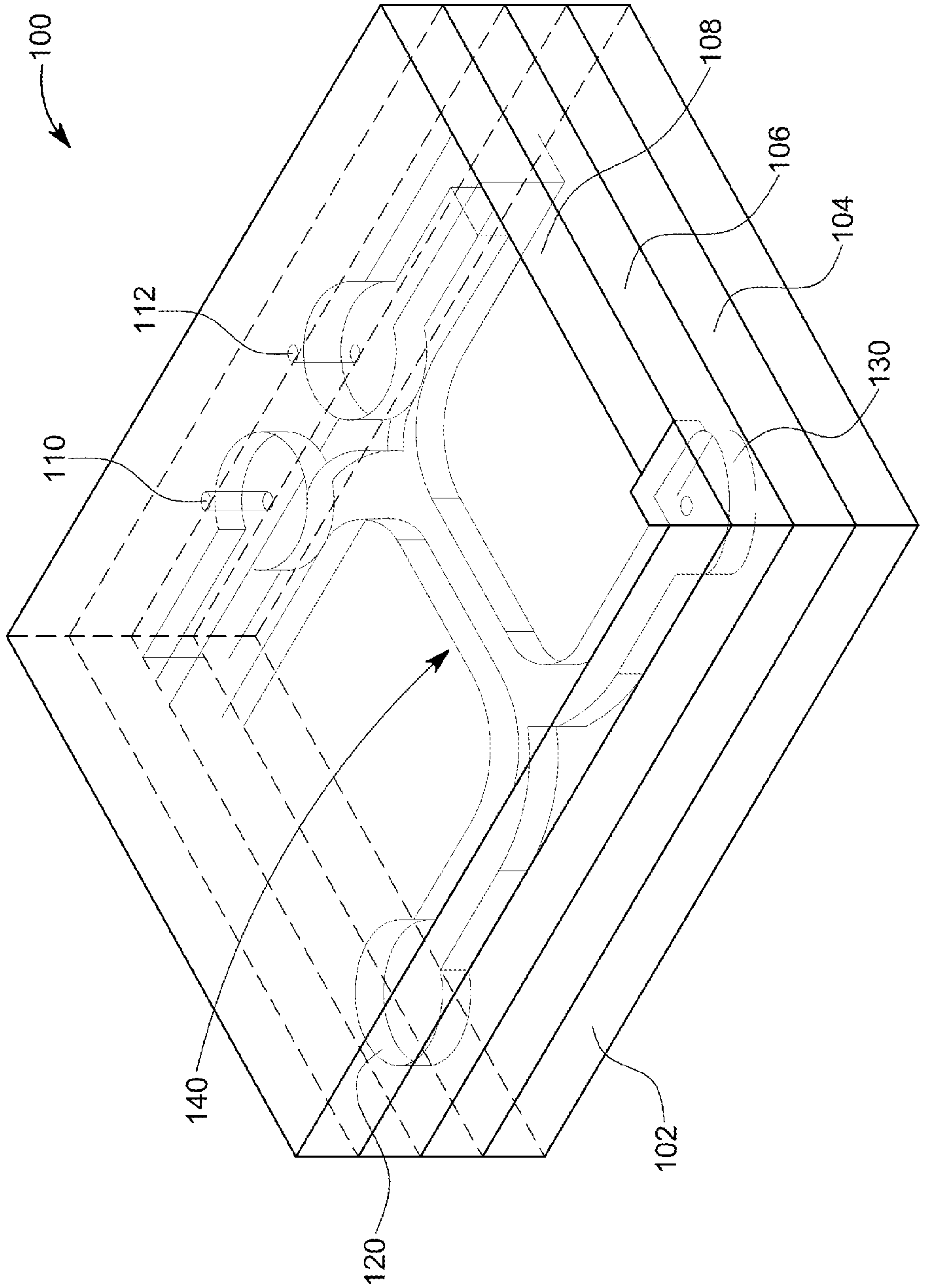
FIG. 1 is a schematic diagram of a microfluidic chip that implements the OR and AND logic functions based of an input fluid.

More specifically, in one embodiment, a microfluidic chip 100 having logic gates is based on the 3D integration and stacking of a number of layers of PMMA sheets with microchannels. As shown in FIG. 1, the microfluidic chip 100 with logic gates, called herein "the chip," has a substrate 102 on which plural sheets 104, 106, 108 are stacked on top of each other, with the layer 108 being the top layer. More or less layers can be used. $CO_2$ laser ablation with different power and speed specifications are used to create microchannels 140 with different dimensions into the layers 104, 106, and 108. The microchannels 140 may have any size smaller than 1 mm. The microchannels may extend vertically, all the way through a given layer 104, or only partially, or they may extend horizontally.

Figure 2:
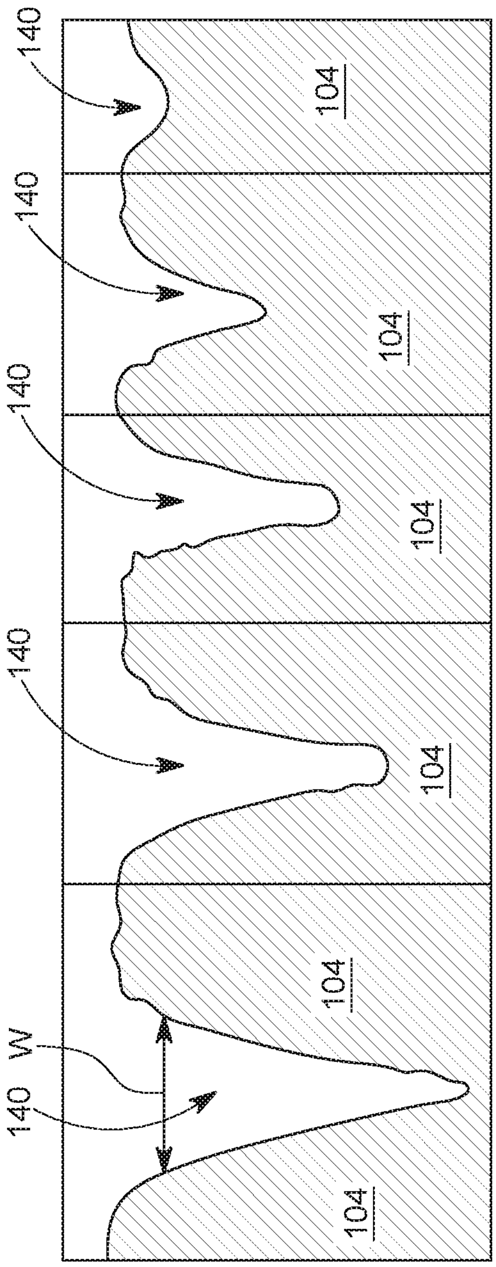
FIG. 2 is a cross-section of the microchannels formed in the microfluidic chip of FIG. 1.

The obtained shape of the microchannels 140 is Gaussian due to their small widths, as illustrated, for example, in FIG. 2, which restricts the proper development of the well, while macro-channels with large widths (>1 mm) result in a rectangular shape. In particular, due to this effect, changing the width W of the microchannel while adjusting the power and speed of the laser result in channels with different depths, as also shown in FIG. 2. FIG. 2 shows five cross-sections of five different layers 104 placed next to each other for comparing the different shapes of the microchannels 140.

In one embodiment, for a specific fixed width W of the microchannel, it is known that in order to get deeper channels, the power of the laser can be increased with a constant cutting speed or the speed of the laser can be reduced for a giver power. This ensures that the laser ablation effect on a specific area is more pronounced, and thus, as a result, a deeper channel is obtained. However, it is observed that the obtained width of the microchannel is also affected as shown in FIG. 2, where a fixed power of 10% and a speed of 8% result in a channel width of 473 μm while when reducing the speed to 4%, it results in a channel width of 518 μm. note that the channel width W is measured where the channel has the largest width. The same applies to the case when the laser speed is fixed and its power is modified, i.e., the width of the channel is affected in addition to its depth. Therefore, in order to maintain the same width W of the microchannel, but increase/reduce its depth, the laser characteristics needs to be optimized in terms of both the laser power and speed.

Another observed effect during the $CO_2$ laser ablation of the PMMA layers is that the surface roughness of the channel sidewalls increases at higher speeds. The surface roughness of the microchannel affects its hydraulic resistance and consequently, the flow rate range of operation of the microfluidic logic gates. While this embodiment use layers 104 to 108 made of PMMA, other polymeric materials may be used for forming the layers of the chip 100.

In addition to the microchannels 140 shown in FIG. 1, which extend horizontally along the largest surface area of the various layers 104, 106, input or output vertical channels are also made through these layers and they serve as the input and output ports of the chip 100. More specifically, as shown in FIG. 1, input ports 110 and 112 serve as the inputs for the fluid used to implement the logic functions, and output ports 130 and 120 serve as the outputs of the fluid. The input ports 110 and 112 are made into the top layer 108 and the output ports 120 and 130 are made into different layers, for example, layer 104 for output port 120 and layer 106 for output port 130. In this embodiment, the output ports 120 and 130 are made in the sides of the chip, for example, in different sides. However, in one application, the two output ports may be made in the same side of the chip.

Figure 3:
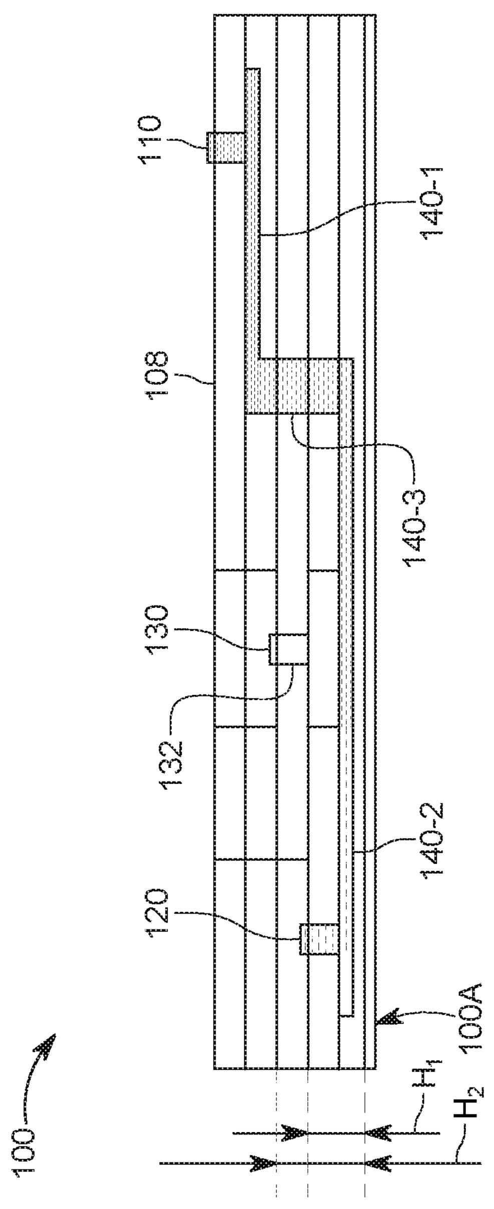
FIG. 3 shows a cross-section of the microfluidic chip shown in FIG. 1.

As will be discussed later, in one embodiment, two different fluids may be used for achieving the OR and AND logic functions. In other applications, more than two inputs could be used. The same concept of pressure-driven operation could also be used to develop other logic gates such as NAND, NOR, XOR, etc. As a result, chips performing complex computations with more than two inputs and more than two outputs could be developed. In addition, multiple logic gates could be cascaded and integrated together on the same chip. The horizontal microchannels 140 and the vertical channels corresponding to the input and output ports are shown in cross-sections in FIG. 3. FIG. 3 shows only one input port 110, as the second input 112 is not located in this particular cross-section. FIG. 3 also shows the first output port 120 located at a given height H1 relative to the bottom 100A of the chip 100, and the second output port 130 located at a given height H2, larger than H1, relative to the bottom 100A of the chip 100. The fact that the two output ports 120 and 130 are located at different heights relative to the bottom face of the chip (for example, in different layers 104 and 106) is made on purpose for achieving the OR and AND functions, as discussed later.

Figure 4A:
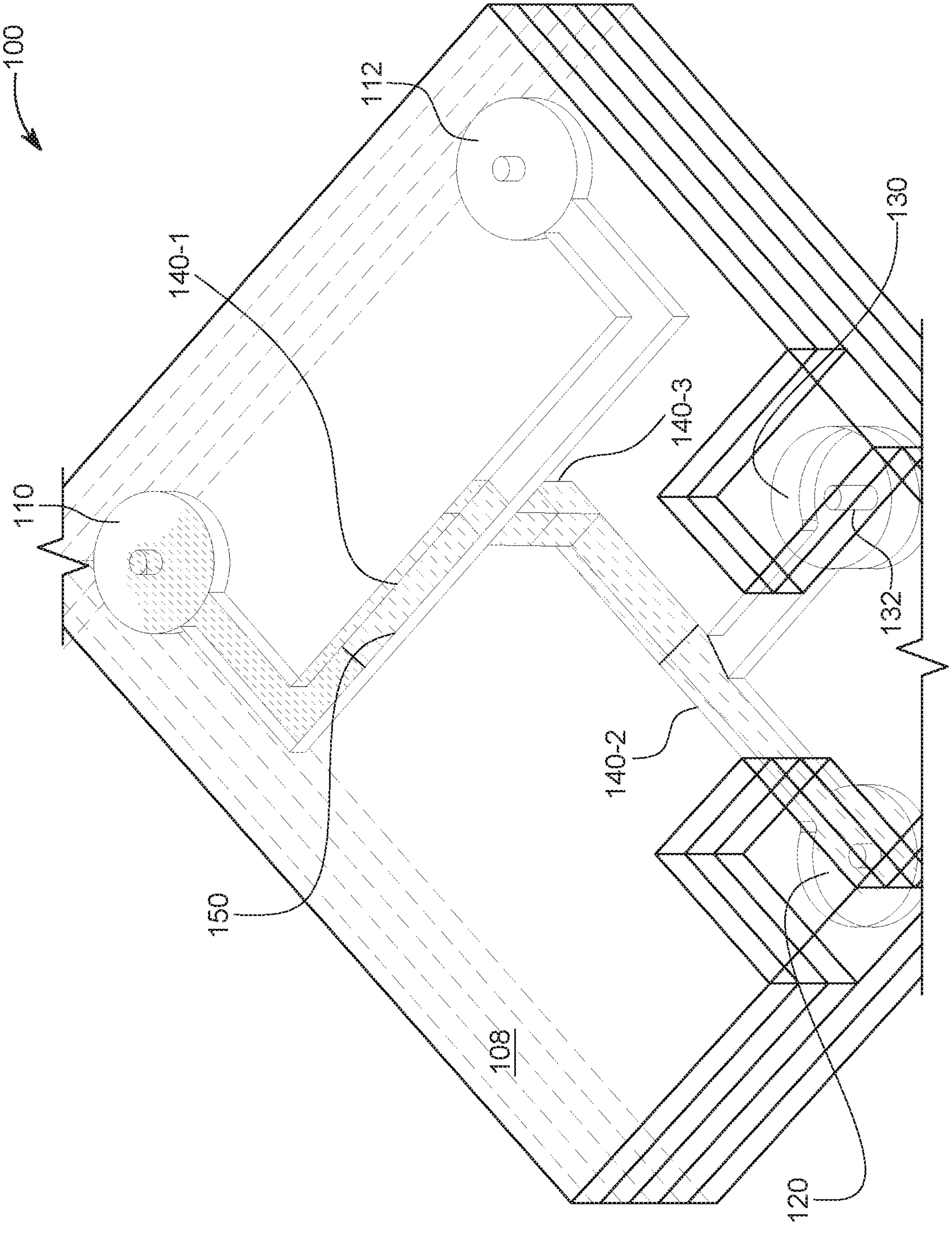
FIG. 4A shows a fluid that propagates through plural microchannels formed in the microfluidic chip when the fluid is injected at a single input port.
Figure 4B:
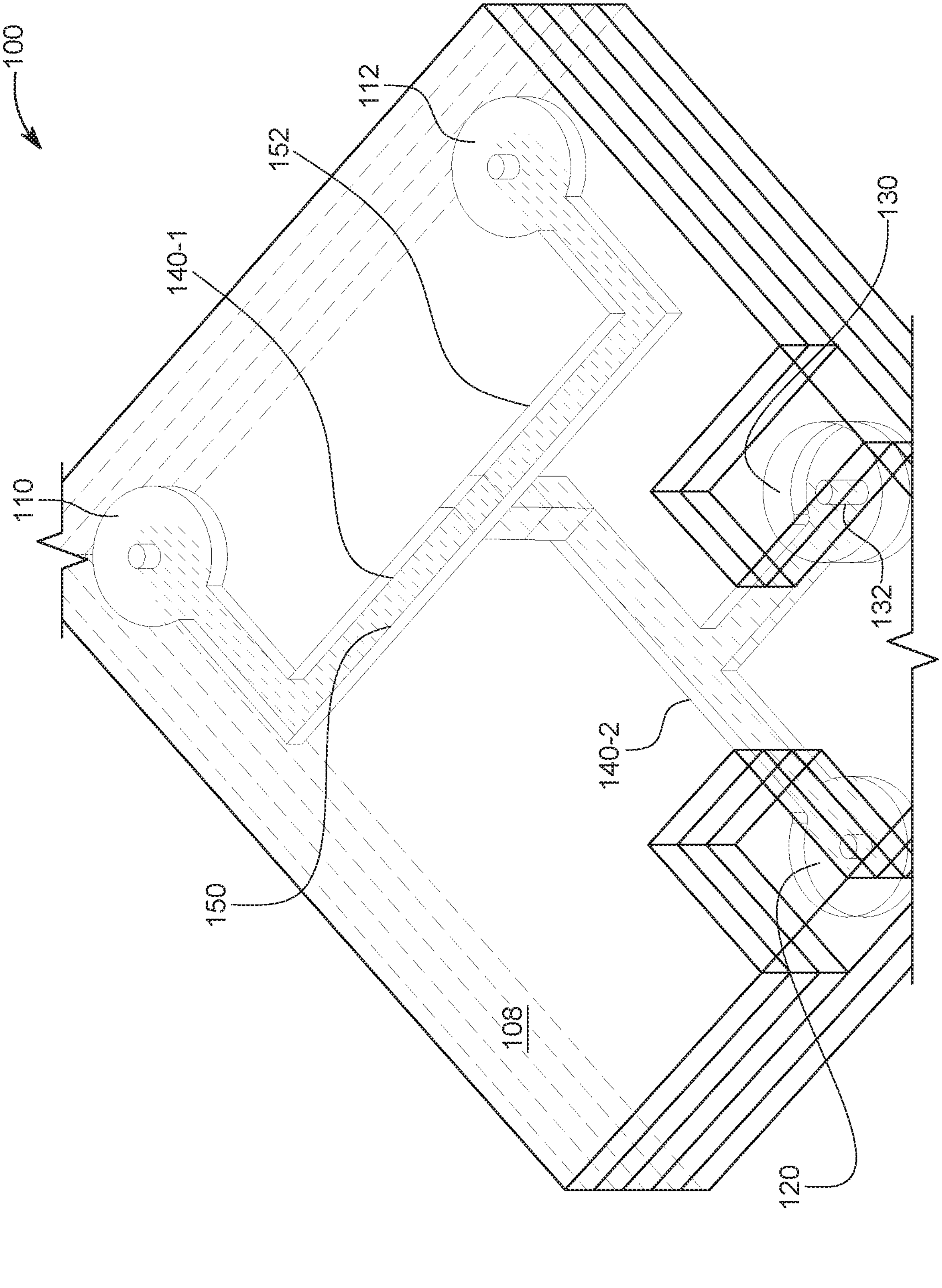
FIG. 4B shows a fluid that propagates through plural microchannels formed in the microfluidic chip when the fluid is injected at both the input ports.

FIG. 3 also shows that a first horizontal microchannel 140-1 is formed at a higher level than the second horizontal microchannel 140-2, and a vertical channel 140-3 fluidly connects the two horizontal microchannels 140-1 and 140-2. A top view of these channels is also illustrated in FIGS. 4A and 4B, which also show the input ports 110 and 112, fluidly connected to the microchannel 140-1, and the output ports 120 and 130, fluidly connected to the microchannel 140-2. While FIG. 4A shows a first fluid 150 being injected only into the first input port 110, FIG. 4A shows the first fluid 150 being injected into the first port 110 and a second fluid 152, different from the first fluid 150, being injected into the second input port 112. Once the laser ablation recipes are optimized to obtain the microchannels 140-1 to 140-3 with the desired depths and widths, the layers 104, 106, and 108 are bonded to each other using a thermo-compression process, to obtain the chip 100 shown in FIGS. 1, 3, 4A and 4B.

The microfluidic input/output ports are pressure driven, and therefore, the two output ports (also called gates) 120 and 130 are designed to be located at different heights, so that the second output port 130, or the AND output port, is placed at a higher level H2 than the first output port 120, or the OR output port, as shown best in FIG. 3. As a result of this placement, a higher pressure is required in order to activate the AND port when compared to the OR port. This means that when the fluid 150 is input at a single input port, 110 or 112, the fluid flows along the horizontal microchannel 140-1, then falls down along the vertical channel 140-3, and then it continues its horizontal move along the microchannel 140-2 to the OR port 110, as the OR port 120 is located below the AND port 130. This is so because the pressure of the fluid 150 in the last horizontal microchannel 140-2 is not high enough to move vertically upward along the vertical microchannel 132, that fluidly connects the microchannel 140-2 to the AND port 130.

Figure 5A:
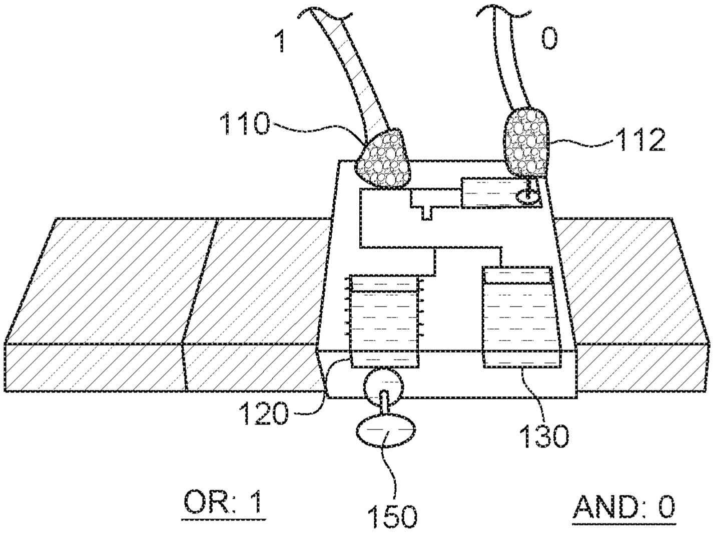
FIG. 5A illustrates the microfluidic chip for which the fluid is injected only at the first input port and only the OR port is activated.
Figure 5B:
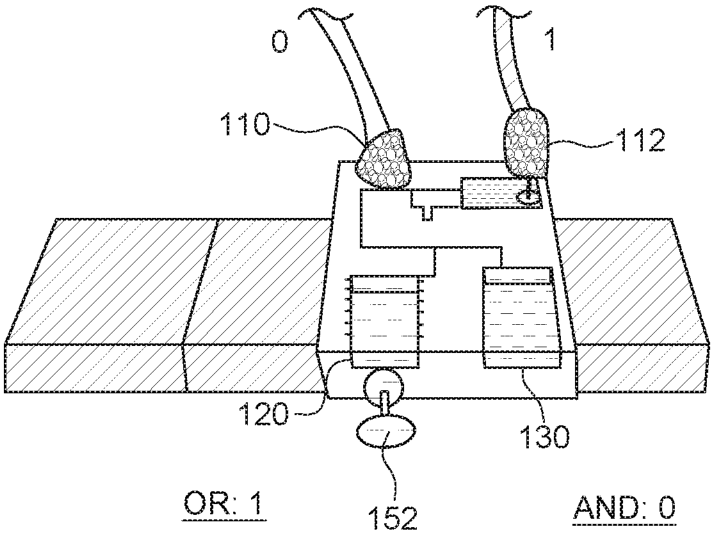
FIG. 5B illustrates the microfluidic chip for which the fluid is injected only at the second input port and only the OR port is activated.

This means that when only one input port 110 or 112 is used for receiving the fluid 150, the pressure for injecting the fluid 150 into the selected input port is chosen to be large enough to push the fluid 150 along the microchannels 140-1, 140-3, and 140-2, and then into the OR port 120, but it is not large enough to overcome the vertical microchannel 132, to exit the AND port 130. This situation is illustrated in FIGS. 5A and 5B. More specifically, FIG. 5A shows that the fluid 150 is injected to the first input port 110 (digit 1 is shown in the figure next to this port) but not at the second input port 112 (digit 0 is shown in the figure next to this port). The same figure shows that the fluid 150 is dripping off at the OR port 120 (digit 1 is shown in the figure), but not at the AND port 130 (digit 0 is shown in the figure). A similar output is shown in FIG. 5B, with the only difference that a different fluid 152 is input at the second input port 112, and not at the first input port 110. The result in each figure indicates that as long a fluid is injected at only one input port, either input port 110 or input port 112, only the OR port 120 is activated.

Figure 5C:
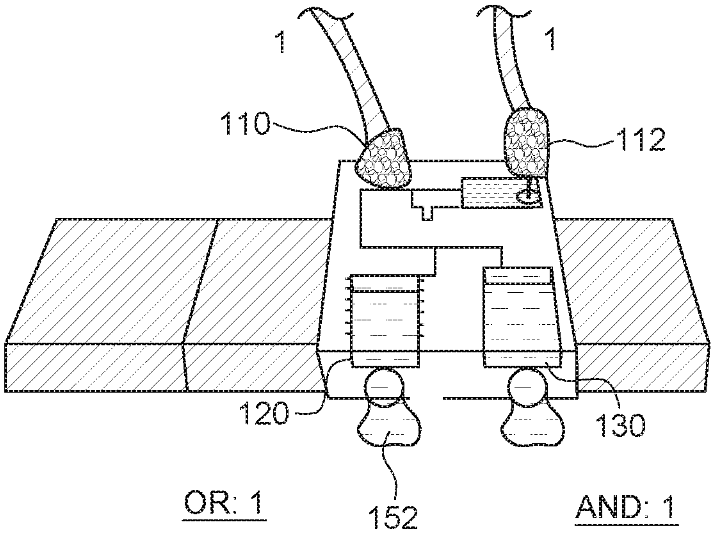
FIG. 5C illustrates the microfluidic chip for which the fluid is injected at both the first and second input ports and both the OR and AND ports are activated.

To activate the AND port 130, both the input ports 110 and 112 need to receive a fluid or different fluids, as shown in FIG. 5C. This figure shows that different fluids 150 and 152 are provided at the input ports 110 and 112, respectively. Because of this, the pressure of the combined fluid at the vertical microchannel 132 is high enough to push the fluid out of the AND port 130, as also shown in FIG. 4B. Note that in this case, both the OR port 120 and the AND port 130 are activated, as shown in FIG. 5C.

In other words, when the fluid(s) flows simultaneously into both the input ports 110 and 112, it results in the fluid flowing out of both the AND port and the OR port, which describes the logical operation A.B=1 (where the operation "." means "or"), and A+B=1. However, when only one input is activated (i.e., A'.B=1 or A.B'=1, and the operation means the "opposite of"), the pressure drop across the AND port 130 is not large enough to turn it on, and the fluid flows only out of the OR port 120.

Figure 6:
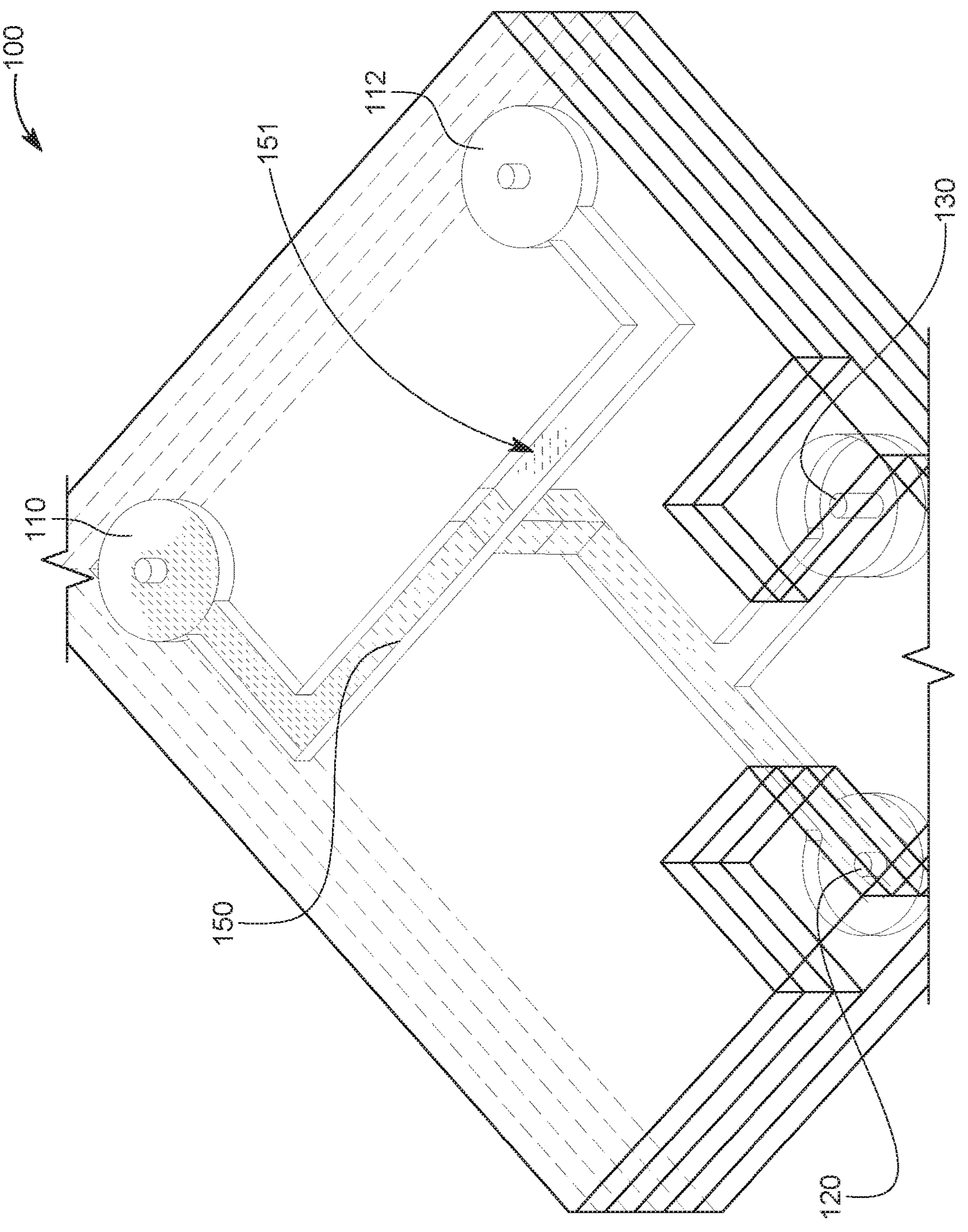
FIG. 6 illustrates a side effect when the fluid is injected at only one input port and it partially drifts toward the second input port.
Figure 7:
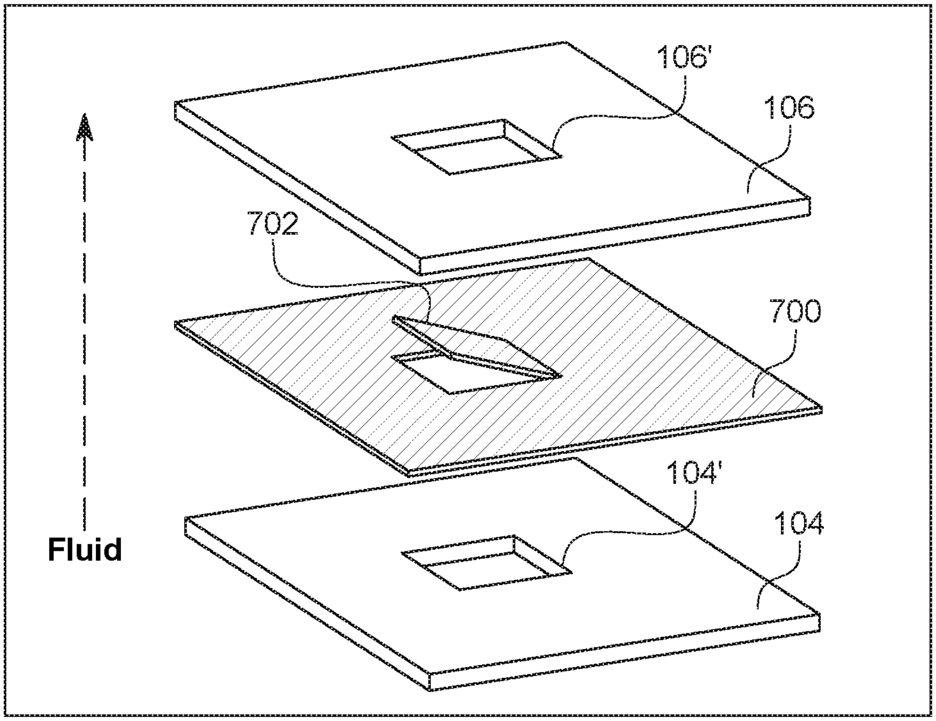
FIG. 7 shows a cantilever structure that is added to prevent the fluid to drift from one input port to another input port.
Figure 8:
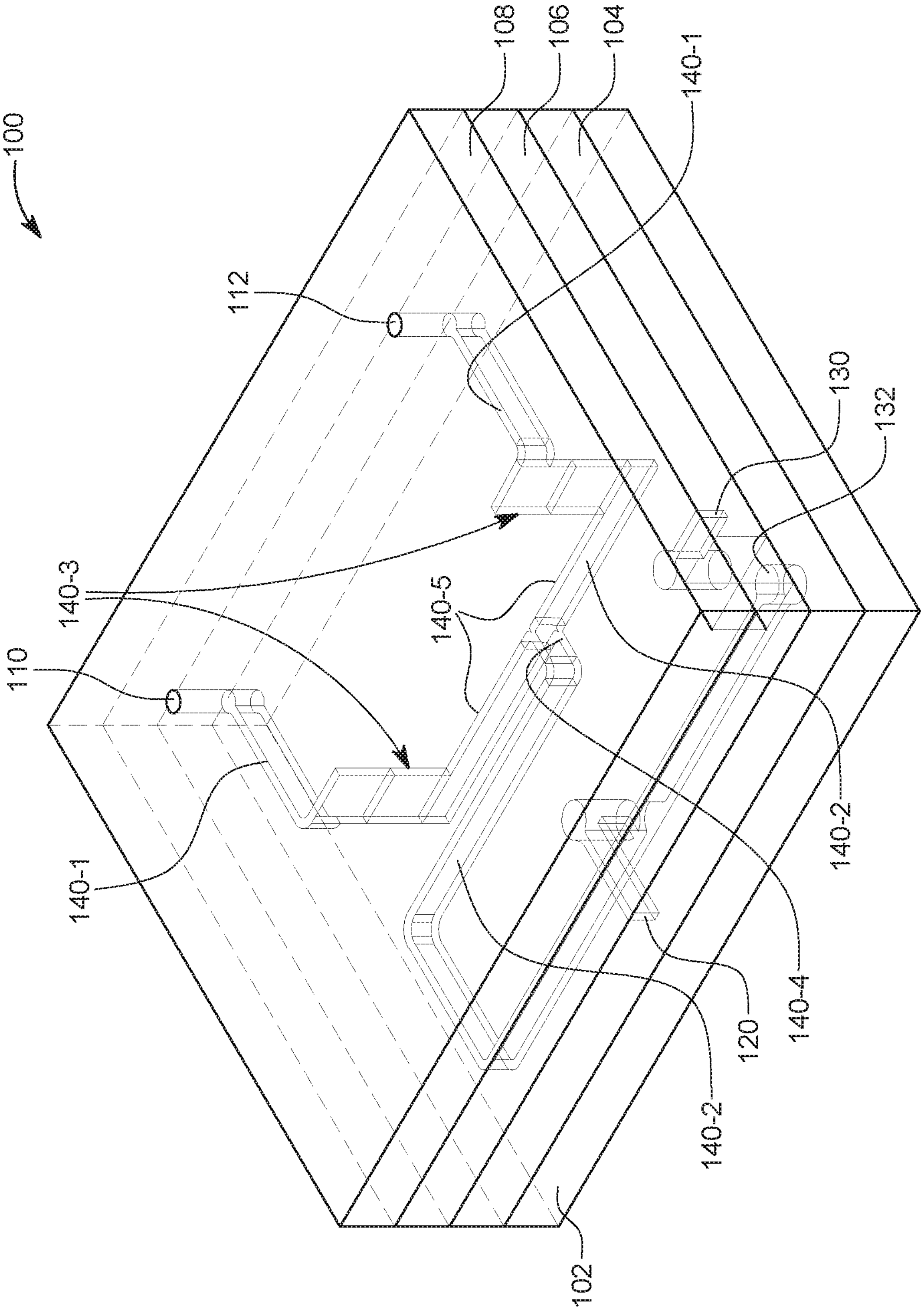
FIG. 8 shows another implementation of the microfluidic chip.

One challenge that has been observed during the operation of the microfluidic chip with one fluid input (A'.B=1 or A.B'=1, where A stands for input port 110 and B for input port 112) is the backflow of a small amount of the fluid 151, from one input port, e.g., 110, into the other input port, e.g., 112, due to capillary forces, as shown in FIG. 6. To overcome this challenge, in one embodiment, a flexible polyimide-based (PI) cantilever-like structure 702, as shown in FIG. 7, is embedded in between the PMMA sheets 104 and 106, at the intersection of both inputs 140-1, which is shown in FIG. 8 as the intersection 140-4, to enable a one-directional flow of liquids. FIG. 7 shows the cantilever structure 702 formed into a thin PI layer 700, and the layer 700 being placed between the layers 104 and 106, with the cantilever structure 702 fitted between the through holes 104' and 106' of the layers 104 and 106, respectively. In one embodiment, the through holes 104' and 106' may be part of the vertical microchannel 140-3, as shown in FIG. 4A, or it may be provided at the intersection 140-4, as shown in FIG. 8. Using this approach, the AND and OR ports 120 and 130 with two input ports 110 and 112 are found to work properly. The device 100 shown in FIG. 8 is different from the one shown in FIG. 1 in the sense that a vertical channel 140-3 is provided for each input, and then the vertical channels 140-3 communicate with additional horizontal channels 140-5 before intersecting at common point 140-4.

Figure 9A:
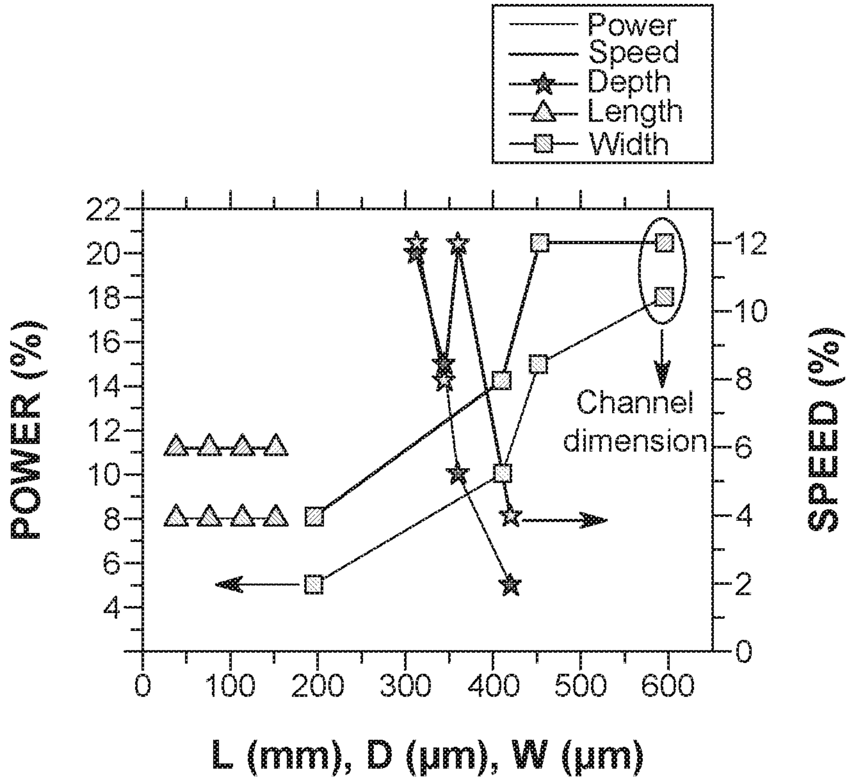
FIG. 9A shows the power and speed of the various implementations of the microfluidic chip, as a function of the sizes of the microchannels.

To study the effect of scaling down the microchannels, on the performance of the logic gates, different configurations were tested to obtain either different depths, lengths or widths of the various microchannels, while fixing the other dimensions, as shown in FIG. 9A. For the depth study, the length and width of the microchannels were fixed at 38 mm and about 300 μm, respectively. For the length study, the depth and the width were fixed at about 470 μm and about 300 μm, respectively, while for the width study, the length and depth were fixed at 38 mm and about 250 μm, respectively. Note that the width and depth of the microchannels is not larger than 1 mm.

The pressure drop between an input and an output in the chip is $\Delta P = R_H \times Q$, where $R_H$ is the hydraulic resistance and Q is the flow rate. The hydraulic resistance is related to the dimensions of the channel and fluid according to the relationship $$R_H = \frac{C_{geometrical} \times \mu \times L}{W \times D^3},$$

where L, W and D are the length, width and depth of the microchannel, respectively, p is the viscosity of the fluid, and $C_{geometrical}$ is a geometrical factor that depends on the shape of the channel and its roughness. Because $R_H$ is not easy to be calculated, especially with several variables that are not fixed for the whole channel, such as the roughness and geometrical factor, the effect of the flow rate on the device performance was studied. In fact, to insert the fluids into the input ports 110 and 112, a syringe pump was used which enables the user to set the flow rate.

Figure 9B:
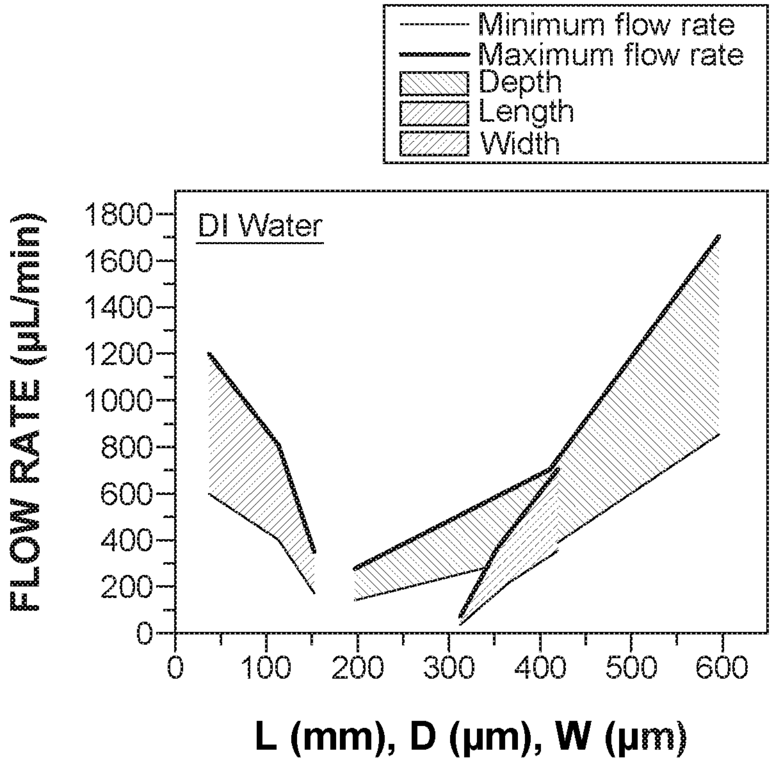
FIG. 9B shows the flow rate of the various implementations of the microfluidic chip as a function of the sizes of the microchannels when the fluid is water.

Two fluids were tested: deionized (DI) water and 20:80 glycerol:water, which has a higher viscosity. It is observed that the logic ports 120 and 130 are operational for a specific range of flow rates, as shown in FIG. 9B for DI and in FIG. 9C for 20% glycerol. Using flow rates beyond the upper limit, one fluidic input (A'.B=1 or A.B'=1) results in a fluidic output in both the AND and OR gates due to the high resulting fluid pressure, while using a flow rate below the lower limit results in a no output at the AND gate, when both inputs are turned on, due to the very low pressure drop across the channel. In particular, the upper and lower flow rate limits are shown to reduce at higher lengths, smaller widths and smaller depths. In fact, since the hydraulic resistance is directly proportional to the length and inversely proportional to the width and to the cubic depth of the microchannels, this will cause the increase of the hydraulic resistance and therefore, an increase in the pressure drop across the channel. As a result, with one fluidic input, both the AND and OR outputs are turned on. Therefore, as the length (depth, width) is increased (reduced, reduced), the hydraulic resistance is increased, which requires the reduction of the flow rate to maintain the same operational pressure drop, as illustrated in FIG. 9B. Moreover, using a more viscous fluid (glycerol:water), the upper and lower limits of the operational flow rate are reduced when compared to the water case, as shown in FIG. 9C, due to the fact that the hydraulic resistance increases with the viscosity.

The surface roughness of the microfluidic channel plays an important role as well in determining the operational flow rate. To explain this effect, two devices with different dimensions are considered: a Device 1 is chosen from the width study in FIG. 9B, using W=313 μm (while D and L are fixed at 250 μm and 38 mm, respectively), and a Device 2 is chosen from the depth study, using D=200 μm (while W and L are fixed at 300 μm and 38 mm, respectively). It can be concluded, based on the dimensions of the microchannels in the two devices, that the Device 1 has a smaller $R_H$ (due to the larger W and D). However, the upper and lower limits of the operational flow rates are smaller for the Device 1, which is contradictory to the above discussed reasoning. However, based on FIG. 9A, it can be seen that the used specification to create the microchannels in the Device 1 shows a higher power and higher speed (P=20%, S=12%) than the specification used for the Device 2 speed (P=5%, S=4%). As a result, the surface roughness in the Device 1 is higher, which overcompensates the effect of the larger D and W and causes an overall increase in the hydraulic resistance compared to the case of the Device 2. As a result, the operational flow rate in the Device 1 is lower than in the Device 2.

Figure 9C:
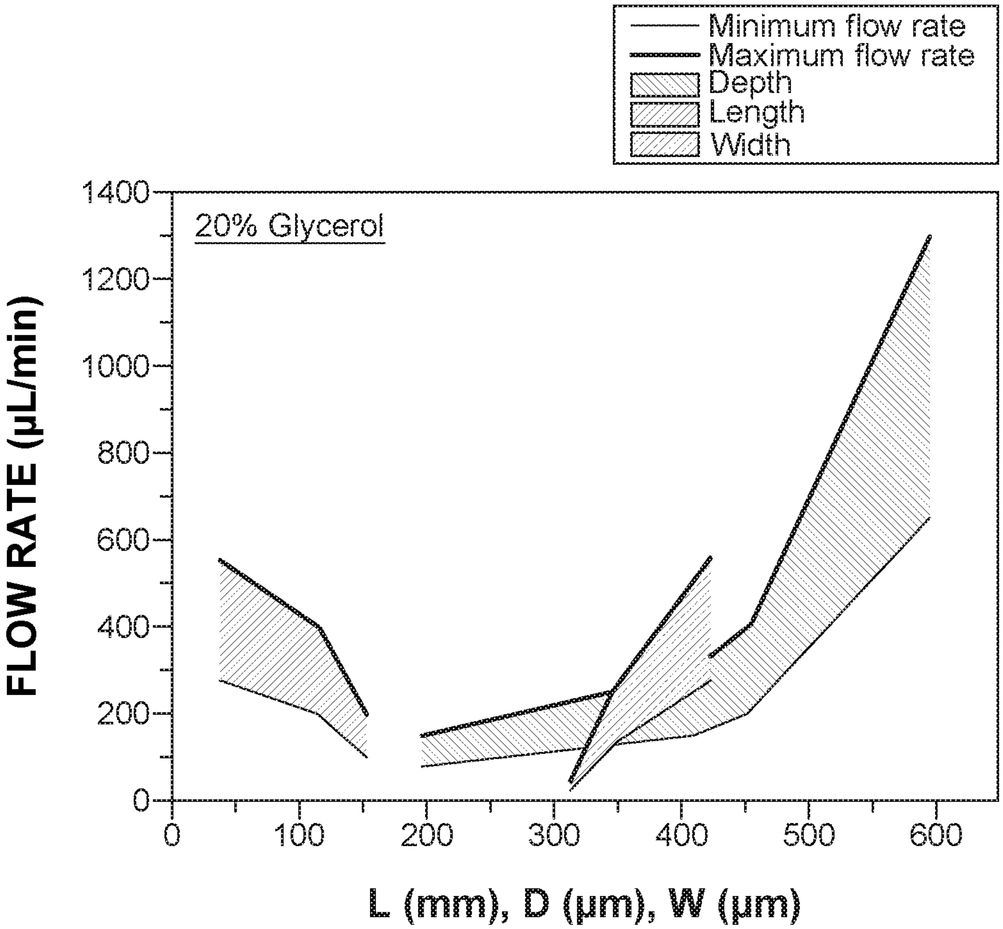
FIG. 9C shows the flow rate of the various implementations of the microfluidic chip as a function of the sizes of the microchannels when the fluid is a viscous fluid.

When comparing the slope of the operational flow rate for the devices with different dimensions as illustrated in FIGS. 9B and 9C, it can be observed that the depth study shows the smallest slope, and the reason for this is the dependence of the $R_H$ on $1/D^3$. However, it is also observed that for the width study, a reduction in the operational flow rate by a larger factor than the depth study. Since the hydraulic resistance is inversely proportional to the width and directly proportional to the length, it is expected that the operational flow rate of both studies should change by around the same factor when a different fluid is inserted.

However, the studied devices are based on the laser ablation of channels followed by the 3D stacking of PMMA sheets, and as a result, when the width of the microchannel is increased, the fluid will be in contact with a larger surface area of the polished PMMA (top of the channel). Therefore, in this case, as the width is increased, multiple opposing mechanisms that affect the hydraulic resistance compete, among which the most important include 1) an increase in the polished surface area in contact with the fluid (top of the channel), 2) an increase in the amount of fluid that is not in direct contact with the sidewalls of the channel (center of the channel), and 3) an increase in the surface roughness of the sidewalls (due to the higher laser power and speed as shown in FIG. 9A). As a result, the overall hydraulic resistance experienced by the fluid is increased by a smaller factor when the width is reduced than in the case when the length is increased.

Figure 10A:
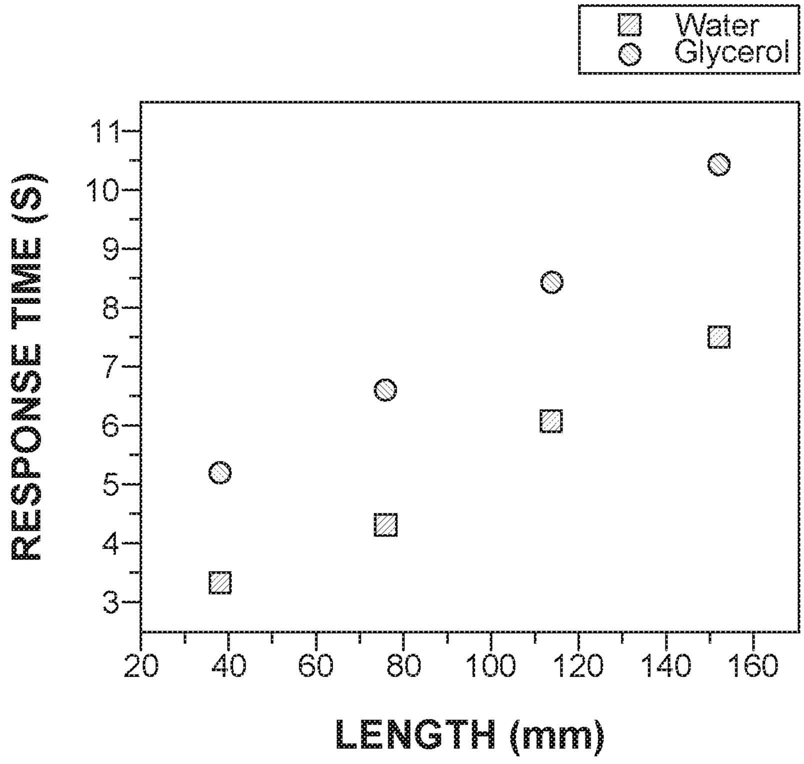
FIG. 10A shows the response time of the microfluidic chip as a function of the length of the microchannels.
Figure 10B:
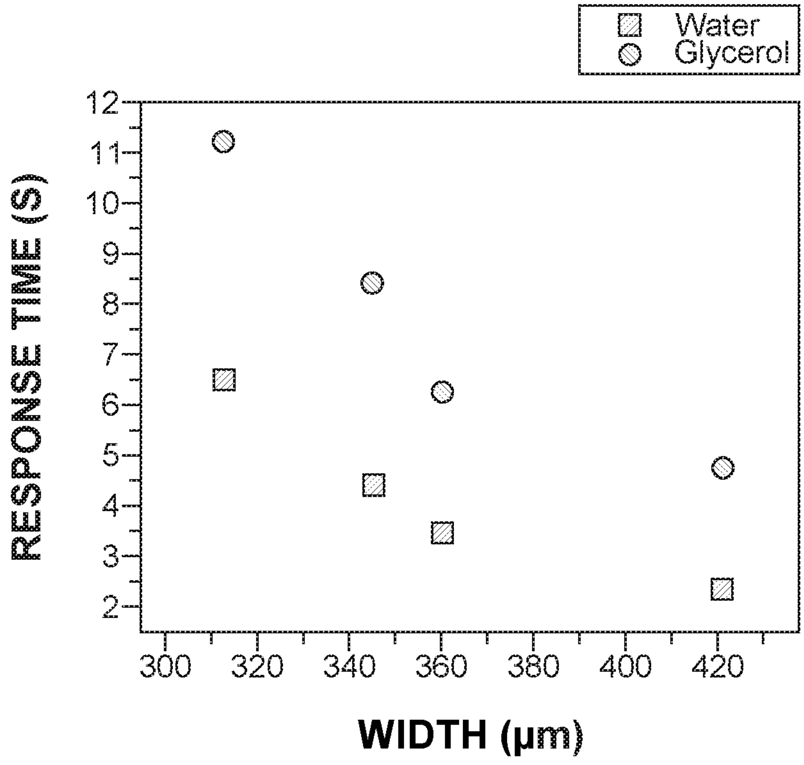
FIG. 10B shows the response time of the microfluidic chip as a function of the width of the microchannels.
Figure 10C:
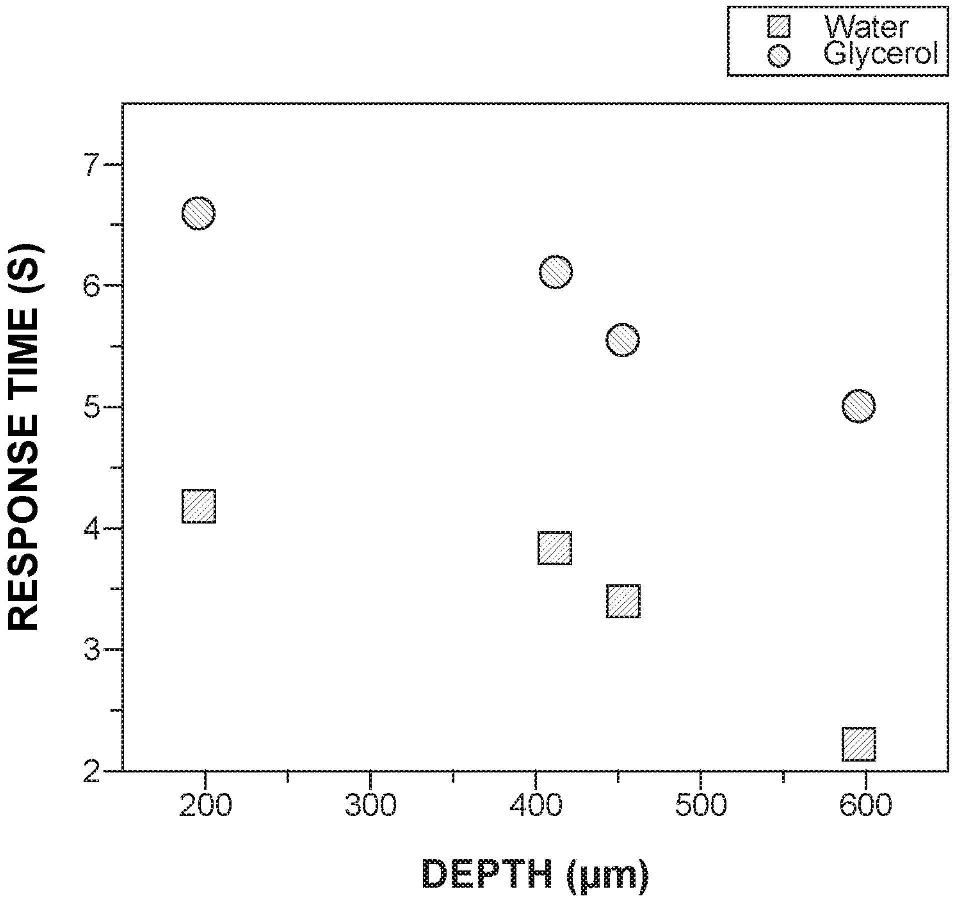
FIG. 10C shows the response time of the microfluidic chip as a function of the depth of the microchannels.
Figure 11:
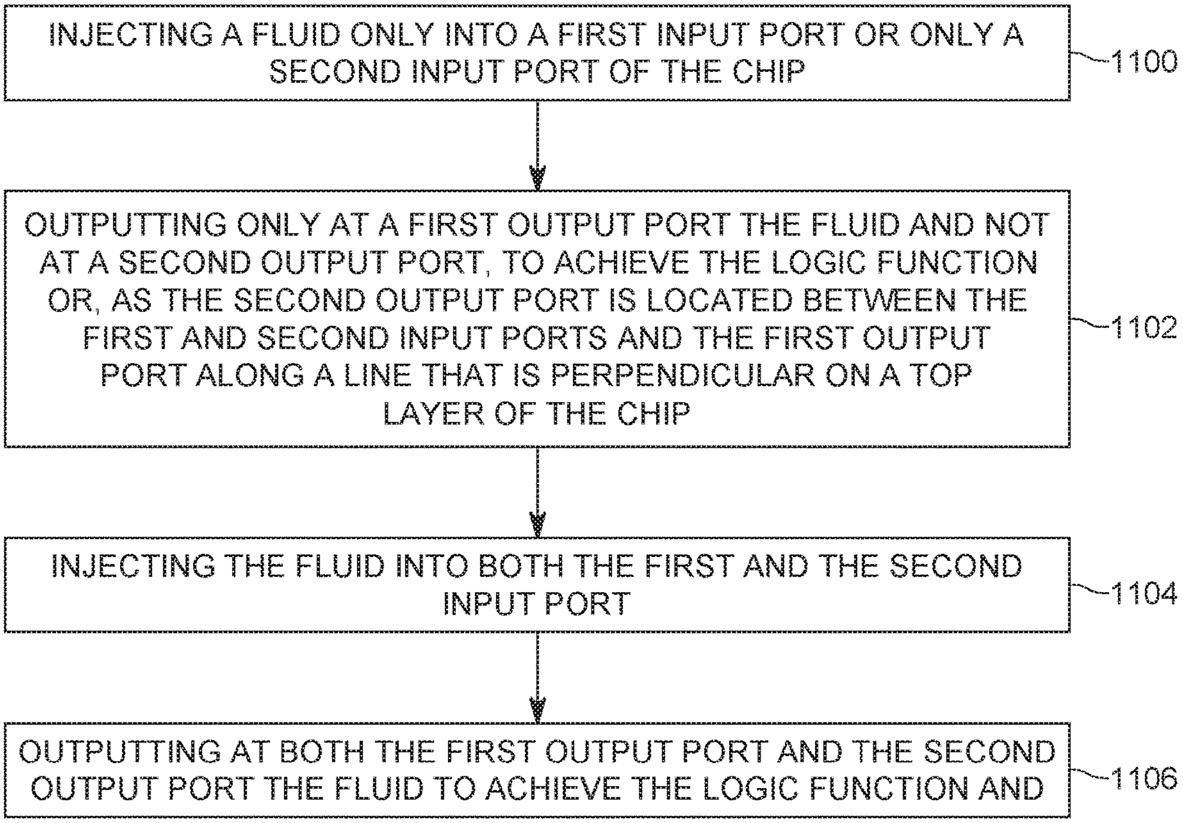
FIG. 11 is a flow chart of a method for implementing the OR and AND logic functions with the microfluidic chip.

The response time for the fluidic OR gate was studied for the devices with different dimensions and different fluids using a fixed flow rate of 300 μL/min, as illustrated in FIGS. 10A to 10C. The results show that the response time increases linearly with the length (see FIG. 10A), but not with the width and depth (see FIGS. 10B and 10C). This can be explained by the fact that the hydraulic resistance in the latter cases is affected by the change in the surface roughness as well due to the different optimized specifications for the width and depth studies (FIG. 9A) in addition to the $R_H$ variation with $1/D^3$.

Therefore, a 3D multilevel microfluidic chip 100 with two Boolean logic gates (AND and OR) 120 and 130 is demonstrated. The microfluidic logic gates operation is based on the pressure drop between the inputs and outputs of the device, which is a function of both the hydraulic resistance (fixed for a given device) and the flow rate set using a syringe pump. The presence of the fluid at the output represents a logic signal 1 while its absence is a logic signal 0. As a result, the demonstrated microfluidic logic devices can be easily used with any fluid and cascaded with other similar devices to achieve integrated and complex computations. The results show that the logic gates are operational for a specific range of flow rates, which are dependent on the microchannels dimensions, surface roughness and fluid viscosity. The response time of the logic gates was investigated for devices with different dimensions, and the results confirmed its dependency on the channel hydraulic resistance.

For fabricating the layers 104, 106, 108 discussed above, according to one embodiment, PMMA sheets were used and microchannels were formed with a $CO_2$ laser tool with a maximum power of 75 W. In this embodiment, PMMA sheets with a 2 mm thickness were used in addition to a flexible 120-μm-thick polyimide (PI) sheet 700 for blocking the backflow of fluids, as illustrated in FIG. 7. The chip 100 includes 4 PMMA sheets and an embedded PI sheet 700. The PI sheet was patterned using the $CO_2$ laser to obtain a cantilever-like structure 702 to enable the one-directional flow of the fluid 150. All the layers 102, 104, 106, and 108 may be aligned using metallic pins inserted at the edges of the device.

Next, a thermo-compression tool was used to bond the several layers of the device. In this embodiment, the bonding procedure is as follows: first, the PMMA sheets are aligned using the metallic pins, next the microfluidic device is placed between two silicon wafers to avoid direct contact between the hot plates and the PMMA sheets. The complete sandwich of silicon wafers and PMMA sheets was then placed in between the hotplates in the thermos-compression tool. The temperature of the plates was set to 120° C. and the spacing between the plates was narrowed down to the exact thickness of the sandwich (no applied pressure) to provide heat transfer by conduction and to avoid trapping air within the device, which would otherwise result in air bubbles between the PMMA sheets. Once the temperature of the system reaches 120° C. (higher than the glass transition temperature of PMMA), a pressure of 20-40 lbs was applied between the hotplates to compress and bond the layers. The heaters are then turned off and the cooling valves are opened to cool down the device. The pressure was kept constant until the temperature reached a value of 90° C.

The obtained microfluidic chips 100 were tested using a syringe pump. Two syringes with 60 mL capacity were installed. Deionized water and 20:80 Glycerol:DI were used during the experiments. In the apparatus, the volumetric flow set point (flow rate) was changed to study its effect on the operation of the logic gates.

The microchip 100 may be used in various practical implementations similar to an electronic chip that is capable of making logical operations as OR and AND. For example, in one implementation, the microchip 100 may receive at the first input a nutrient for a plant while it may receive pure water at the second input, and either one of these two or a mixture of the two may be delivered to a system that responds in kind and delivers only nutrients, or only water, or a mixture of both of them to plants in a farm. Many other implementations of such microfluidic chip may be imagined by those skilled in the art, for example, for performing mathematical calculations on a lab on a chip device. In such devices, when they are typically attached to the human skin or implemented inside the body, supplying electrical energy is problematic. Thus, the microfluidic chip 100 may be adapted to perform various mathematical calculations based on a body fluid input only, i.e., with no electrical energy input.

A method of using the microfluidic chip 100 to achieve a logic function OR and a logic function AND is now discussed. The method includes a step 1100 of injecting the fluid 150 only into a first input port 110 or only a second input port 112 of the chip 100, a step 1102 of outputting only at a first output port 120 the fluid 150 and not at a second output port 130, to achieve the logic function OR, as the second output port 130 is located between the first and second input ports and the first output port along a line that is perpendicular on a top layer 108 of the chip 100, a step 1104 of injecting the fluid 150 into both the first input port 110 and the second input port 112, and a step 1106 of outputting at both the first output port 120 and the second output port 130 the fluid 150 to achieve the logic function AND.

In this embodiment, the first input port 110 is formed into the top layer 108, the second input port 112 is formed into the top layer 108, the first output port 120 is formed into a first layer 104, the second output port 130 is formed into a second layer 106, wherein the second layer 106 is formed over the first layer 104, and a network of fluidic microchannels 140 fluidly connects the first input port, the second input port, the first output port, and the second output port.

The disclosed embodiments provide a microfluidic chip that is capable to support logic functions OR and AND based on a fluidic input, with no electrical energy consumption. It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A microfluidic chip comprising:

a substrate;

plural layers located on top of each other over the substrate;

a top layer located over the plural layers so that the plural layers are sandwiched between the substrate and the top layer;

a first input port formed into the top layer;

a second input port formed into the top layer;

a first output port formed into a first layer of the plural layers;

a second output port formed into a second layer of the plural layers; and plural microchannels configured to fluidly connect the first input port and the second input port to each of the first output port and the second output port so that, when a fluid is injected at the first and/or the second input ports, the fluid moves vertically down and then vertically upward through the plural microchannels, to reach the second output port, wherein the second layer is located over the first layer, and wherein the first and second output ports are directly exposed to an ambient of the microfluidic chip.

2. The chip of claim 1, wherein the first and second input ports extend perpendicular to a top surface of the top layer, and the first and second output ports extend parallel to the top surface of the top layer.

3. The chip of claim 2, the plural microchannels comprising:

a first microchannel extending into the second layer, parallel to the top surface of the top layer, and fluidly connected to the first input port; and a second microchannel extending into the second layer, parallel to the top surface of the top layer, and fluidly connected to the second input port.

4. The chip of claim 3, wherein the first and second microchannels intersect in the second layer, at an intersection point.

5. The chip of claim 4, the plural microchannels further comprising:

a third microchannel that extends through the second layer, perpendicular to the top surface of the top layer, and is fluidly connected, at the intersection point, to the first and second microchannels.

6. The chip of claim 5, the plural microchannels further comprising:

a fourth microchannel that extends into the first layer, parallel to the top surface of the top layer and the fourth microchannel is fluidly connected to the third microchannel.

7. The chip of claim 6, wherein the fourth microchannel fluidly communicates with the first output port, through the first vertical microchannel, and with the second output port, through the second vertical microchannel, and the second vertical microchannel is longer than the first vertical microchannel.

8. The chip of claim 3, wherein the first microchannel is fluidly connected to a third microchannel, which extends perpendicular to the top surface of the top layer, and the second microchannel is fluidly connected to a fourth microchannel, which extends perpendicular to the top surface of the top layer.

9. The chip of claim 8, the plural microchannels further comprising:

a fifth microchannel extending in the first layer, and fluidly connected to the third microchannel;

a sixth microchannel extending in the first layer, and fluidly connected to the fourth microchannel, wherein the fifth and sixth microchannels intersect at an intersection point; and a seventh microchannel connected at the intersection point and also fluidly connected to the first output port, through a first vertical microchannel, and to the second output port, through a second vertical microchannel, and the second vertical microchannel is longer than the first vertical microchannel.

10. The chip of claim 1, wherein the first output port is located on a first side of the plural layers, and the second output port is located on a second side, different from the first side, of the plural layers.

11. The chip of claim 1, wherein (1) when a fluid is injected at the first or second input port, the fluid reaches only the first output port, but not the second output port, as the fluid lacks enough pressure to move vertically upward along a vertical microchannel of the plural microchannels, which is connected to the second output port, and when (2) the fluid is injected at both the first and second input ports, the fluid reaches both the first and second output ports as the fluid has enough pressure to move vertically upward along the vertical microchannel.

* * * * *